Patented Aug. 13, 1940

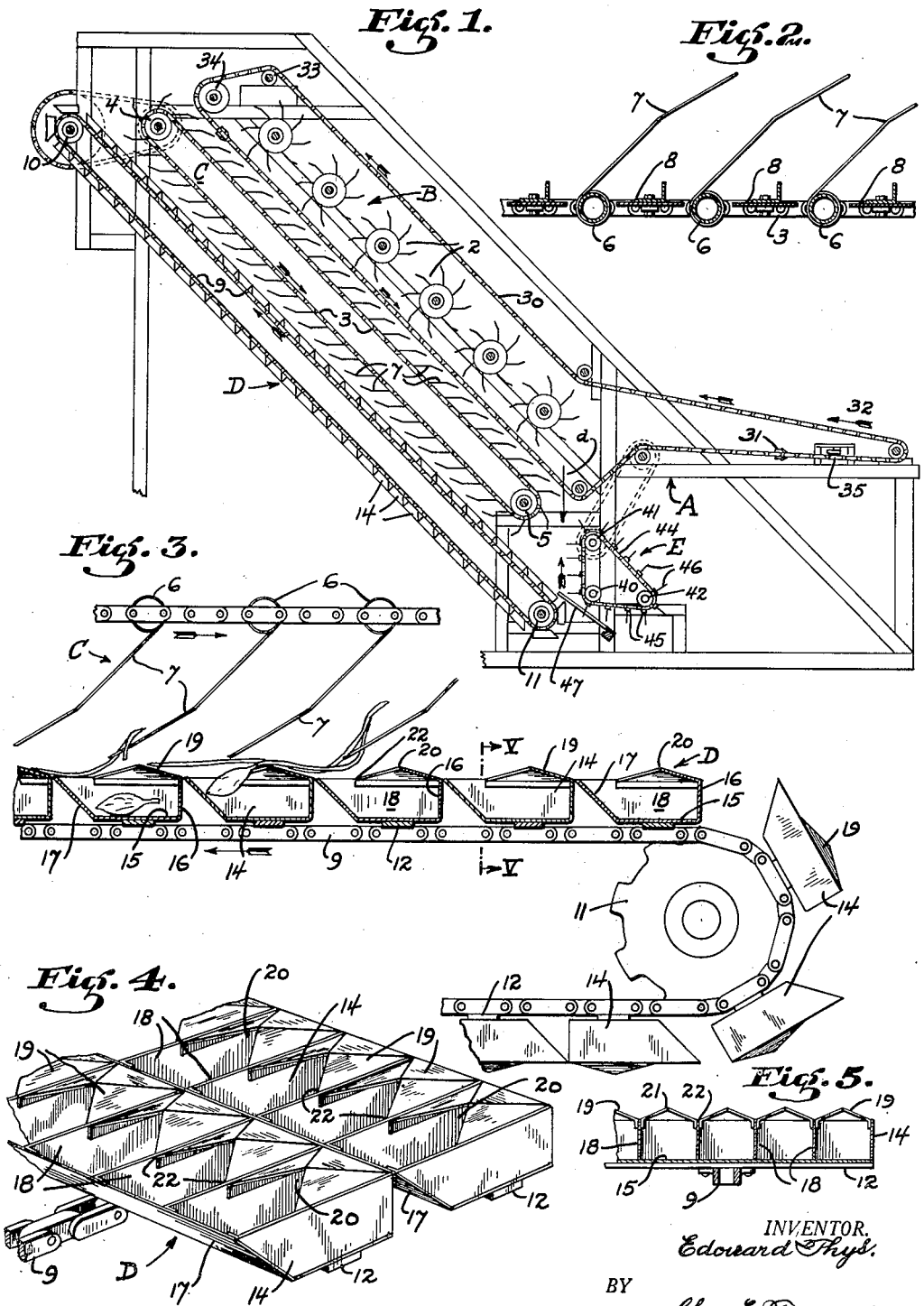

2,211,357

UNITED STATES PATENT OFFICE 2,211,357

HOP PICKING MACHINE

Edouard Thys, Sacramento, Calif., assignor to E. Clemens Horst Company, San Francisco, Calif., a corporation of New Jersey Application October 12, 1938, Serial No. 234,589

6 Claims. (Cl. 130—30)

This invention relates to a hop picking machine, and particularly to a bucket-shaped member which serves both as a picker and as a conveyor for the picked hops.

In the picking of hops by machinery, the vine which is picked is pulled through the machine, and during its passage it is combed or stripped both of hops and of leaves by literally thousands of continuously moving V-shaped wire fingers secured on bars, which in turn are supported by revolving drums or endless belts. The vine when entering the machine will first pass in one direction over certain groups of picking or stripping fingers, and a quantity of hops will be removed. The path taken by the vine is then reversed, and it will next pass below said fingers and over another set of fingers, and so on. The hops, in other words, are gradually removed, and with their removal, clusters of hops together with arms, stems and portions of vines, are stripped and broken off and are deposited on a conveyor, from which the clusters, arms, and broken portions of the vines are picked off by workers ranged along the conveyor, while the hops, leaves and stems continue on and are delivered to a separator. The arms, clusters and broken portions of vines are delivered to another machine known as an arm picker. The arm picker discharges through another separator, helped by manual sorting, and all hops are finally gathered on a common conveyor lined with manual workers to remove stems and leaves missed by the several separators.

An attempt has been made to do away with the many manual workers and to combine in a single machine mechanism for breaking up the clusters and for removing the hops from the vines and broken portions thereof. Such a machine is disclosed in my co-pending application entitled "Hop picking machine," filed June 30, 1937, Serial No. 151,142, and while the machine there disclosed has been fairly successful, improvements have been made, and form the subject matter of this application.

The object of the present invention is to improve hop picking machinery of the type disclosed in the co-pending application, and particularly that part of the mechanism whereby the clusters, arms and broken parts of vines are picked.

The improvements are shown by way of illustration in the accompanying drawing, in which Fig. 1 is a diagrammatic side elevation of a hop picking machine;

Fig. 2 is an enlarged longitudinal cross section of a portion of the picker belt;

Fig. 3 is an enlarged cross section of a portion of the pocketed conveyor and the picker belt cooperating therewith;

Fig. 4 is a perspective view of a portion of the pocketed conveyor; and

Fig. 5 is a cross section taken on line V—V of Fig. 3.

Referring to the drawing in detail, and particularly to Fig. 1, A indicates the main frame of a hop picking machine; B an upper picker unit; C an intermediate and D a lower picker unit. The upper unit B consists of a plurality of continuously revolving drums which are provided with radially projecting V-shaped wire fingers 2. The intermediate unit, hereinafter to be referred to as the picker belt, consists of a pair of spaced sprocket chains 3 supported and driven by pairs of upper and lower sprocket gears 4 and 5. Secured between the chains and crosswise thereof are tubular bars 6, and carried thereby are rows of V-shaped wire picking fingers 7. Also secured between the chains 3 are bars or strips 8 which form fillers between the bars 6 so as to present a continuous floor-like surface to receive and convey picked hops and leaves, as will hereinafter appear.

The lower unit D, which will hereinafter be referred to as the pocketed conveyor, consists of a pair of spaced sprocket chains 9 supported and driven by upper and lower pairs of sprocket gears 10 and 11. These chains are connected by crossbars 12 and they in turn secure rows of buckets 14 which function first of all to pick hops, secondly to receive and protect them after they have been picked, and last but not least to convey and deliver the hops to a separator not here shown. The pocket members are arranged side by side in rows crosswise of the chains 9; each row of pockets is formed by a single member substantially channel-shaped in cross section, that is, it has a bottom portion 15, a right-angular rear flange 16, and a sloping front flange 17. This channel-shaped member is divided into pockets or buckets by a series of cross-plates 18 welded or otherwise secured thereon, and each pocket or bucket is partially covered by a plate 19 in the forward edge of which is formed a V-shaped recess or notch 20. These plates will hereinafter be referred to as "picker plates." They could be horizontally disposed across the pockets, but actual practice has shown that they should, preferably, be V-shaped in cross section, as indicated at 21 in Figs. 4 and 5. By such a formation, V-shaped recesses 22 are formed between the plates, and these recesses are swept by the fingers 7 as will hereinafter appear. The channel-shaped members with the pockets formed therein are riveted or welded to the crossbars 12, and they are closely spaced as shown in Figs. 3 and 4 to present a substantially continuous pocketed surface.

An endless conveyor consisting of a pair of spaced sprocket chains 30 is employed to receive and pull the vines to be picked through the machine. Vine grasper bars such as indicated at 31 are secured crosswise between the chains, and travel therewith. Gripping means are mounted on the grasper bars, to which the vines are attached, and when attached the vines will travel from the point 32 in the direction of the arrow, upwardly over the picker drums B. The conveyor chains and the bar 31 will then pass around the sprocket gears indicated at 33 and 34, when the direction of travel will be reversed and the vines will be pulled downwardly between the drums and the picker belt C, and when the vines have finally passed between them, they will finally be discharged at the point 35.

All the hops and most of the leaves are removed or stripped from the vines during the passage through the machine. Clusters of hops are removed, and arms and parts of the vine are broken from the vine or pulled off. The clusters must be broken up into individual hops, and the hops must be picked from the arms and the broken portions of the vines, as there would otherwise be a considerable loss. In the present instance, the upper side of the picker belt functions not only as a picker but also as a conveyor, as the hops removed by the drums and the picking fingers 7 will settle downwardly between the fingers upon the filler plates 8. The leaves will also settle at this point, while broken arms and clusters will be carried by the fingers upwardly in the direction of the arrow, and will be discharged at the upper end of the unit D, and as the upper side of this unit travels in the direction of the arrow, the hops and leaves will be carried over and discharged into a separator not shown. The clusters, the arms, and the broken portions of the vines will, however, adhere to the fingers 7 and will be pulled by them downwardly between the unit C and the unit D. The clusters are there broken up by the notched picker plates, and the hops are at the same time removed from the arms and vines. The hops forming the individual clusters will deposit in the pockets, and so will the hops which are removed from the arms, and when the pickers pass over the upper sprockets 10 they will be inverted and the hops and leaves will be discharged by gravity. The vines and arms, on the other hand, will continue downwardly with the fingers 7 and will finally reach a discharge member generally indicated at E. This member consists of three shafts indicated at 40, 41 and 42 on each of which are mounted a pair of sprocket gears. The sprocket gears are spaced apart approximately the width of the machine and the sprockets on each shaft align and support and drive chains 44 to which are secured cross bars 45 from the faces of which project pins or spikes 46 which engage the picked arms and vines and discharge them from the machine. Below the sprocket 40 is placed a plurality of spaced slots 47 which function as a guard to prevent individual hops from escaping at the lower end of the belt or conveyor D. A considerable number of hops fall down in the direction of arrow d and while most of them are gathered or fall into the pockets 14 of the conveyor D a few have a tendency to escape, but this is prevented by the slots 47 as the spikes 46 are constantly combing or passing between the spaced slots and any hops reaching the slots are thus engaged by the spikes and thrown back on to the conveyor. It will be noted that there is a considerable spacing between the sprockets 40 and 42. This is important, as any vines which have a tendency to adhere to the spikes will be in a condition of suspension when travelling from the sprockets 42 to the sprockets 40. There is always considerable vibration in a machine of this character and this together with the pull of gravity will free the vines and permit them to drop.

To insure downward movement of the clusters and arms between the picker belt and the pocketed conveyor, the picker belt must travel at a greater speed, as gravity alone is not sufficient. That is, the upper side of the pocketed conveyor travels in an upward direction, while the lower side of the cooperating picker belt travels in a downward direction. If they both travel at the same rate of speed, an object placed between them would merely tend to ball up and rotate. It is for this reason that the speed of the picker belt is greater than that of the pocketed conveyor, and it is due to this greater speed that the clusters and vines are pulled downwardly.

In the machine here shown every attempt is made to bring the picked hops to a state of rest, and to protect them from breakage, the moment they are picked. When the vine first passes over the drums B, a certain proportion of hops and leaves are removed, and the moment they are removed they drop by gravity in a downward direction and are deposited between the fingers on the picker belt. They are there protected to a great extent by the fingers, and are discharged from the upper end of the picker belt onto the upper end of the pocketed conveyor, and by this conveyor are discharged into the separator. All hops obtained by breaking up clusters and by picking arms and broken portions of vines are also protected, and even more so, as they are immediately deposited in the pockets or buckets 14, and once they reach these pockets they can not be broken as they are covered by the picker plates 19, and they will remain in these pockets until they are discharged by the inversion of the pockets when they pass around the upper sprockets 10. In this manner, a better grade of hops is obtained, and hand labor is substantially eliminated. It will be noted that the construction of the picker drums B and the picker belt C, the vine grasper bar and they conveyor, have been only briefly referred to. This is due to the fact that the picker belt per se is completely described and shown in detail in my co-pending application previously referred to. The picker drums are shown in detail in a number of issued patents; and the vine grasper bar and the conveyor whereby it is carried are shown in detail in my co-pending application entitled "Vine grasper bar," filed September 27, 1938, Serial No. 231,909.

Having thus described and illustrated my invention, what I claim and desire to secure by Letters Patent is:

1. In a hop picking machine a picker belt composed of V-shaped picking fingers, a conveyor disposed below and in close proximity to said fingers and presenting to the fingers a plurality of pocketed receptacles, a picker plate partially covering each receptacle, each plate having its forward edge V-shaped to receive and pull hops from a vine, said pockets receiving, conveying and protecting the picked hops, and means for imparting continuous movement to the picker belt and the pocketed conveyor, in a direction opposite to each other.

2. In a hop picking machine a picker belt composed of V-shaped picking fingers, a conveyor disposed below and in close proximity to said fingers and presenting to the fingers a plurality of pocketed receptacles, a picker plate partially covering each receptacle, each plate having its forward edge V-shaped to receive and pull hops from a vine, said pockets receiving, conveying and protecting the picked hops, means for imparting continuous movement to the pocketed conveyor in one direction and means for imparting continuous movement to the picker belt in an opposite direction and at a greater speed.

3. In a hop picking machine a picker belt composed of V-shaped picking fingers, a conveyor disposed below and in close proximity to said fingers and presenting to the fingers a plurality of pocketed receptacles, a picker plate partially covering each receptacle, each plate having its forward edge V-shaped to receive and pull hops from a vine, said pockets receiving, conveying and protecting the picked hops, means for imparting continuous movement to the pocketed conveyor in one direction and means for imparting continuous movement to the picker belt in an opposite direction and at a greater speed, to cause vines or portions thereof to be fed between the picker belt and the pocketed conveyor in the direction of travel of the picker belt.

4. In a hop picking machine a picker belt composed of V-shaped picking fingers, a conveyor disposed below and in close proximity to said fingers and presenting to the fingers a plurality of pocketed receptacles, a picker plate partially covering each receptacle, each plate having its forward edge V-shaped to receive and pull hops from a vine, said pockets receiving, conveying and protecting the picked hops, means for imparting continuous movement to the pocketed conveyor in one direction, means for imparting continuous movement to the picker belt in an opposite direction, and at a greater speed, to cause vines or portions thereof to be fed between the picker belt and the pocketed conveyor in the direction of travel of the picker belt, and means for removing vines and portions thereof when picked.

5. In a hop picking machine a picker belt composed of V-shaped picking fingers, a conveyor disposed below and in close proximity to said fingers and presenting to the fingers a plurality of pocketed receptacles, a picker plate partially covering each receptacle, each plate having its forward edge V-shaped to receive and pull hops from a vine, said pockets receiving, conveying and protecting the picked hops, means for imparting continuous movement to the pocketed conveyor in one direction, means for imparting continuous movement to the picker belt in an opposite direction, and at a greater speed, to cause vines or portions thereof to be fed between the picker belt and the pocketed conveyor in the direction of travel of the picker belt, a conveyor disposed adjacent the end of the pocketed conveyor, and projecting pins on said conveyor for engaging and removing vines and portions thereof when picked.

6. In a hop picking machine an endless conveyor disposed on an incline to present an upper and a lower end, a plurality of pocketed receptacles disposed in rows transverse of the conveyor and secured thereto, a picker plate covering a portion of the open top of each pocketed receptacle, each plate having its forward edge V-shaped to receive and pull hops from a vine, said receptacles receiving and protecting the picked hops and said picker plates being V-shaped in cross section and extending above the open ends of the receptacles, means for imparting continuous movement to the conveyor so that hops picked thereby will be delivered to the upper end thereof and discharged by gravity from the receptacles, and means for feeding hop vines or portions thereof over the surface presented by the pocketed receptacles in a direction opposite to their travel.

EDOUARD THYS.